HENRY E. HARTIG
GEORGE A. BRETTELL JR.

United States Patent Office

2,839,839
BATHYTHERMOGRAPH SIMULATOR

Henry E. Hartig and George A. Brettell, Jr., San Diego, Calif., assignors to the United States of America as represented by the Secretary of the Navy Application August 3, 1945, Serial No. 608,698

5 Claims. (Cl. 35—11)

The present invention relates to practice devices for instructing operators of submarines, and relates also to control apparatus for regulating the response of such practice devices to simulate various operating situations.

Among the factors that must be taken into account by a submarine operator are the density of the water in which he operates, and whether that density increases or decreases with increasing depth. In the oceans, local density differences between different depths are caused largely by temperature differences. Submarines can be provided with temperature recorders, and it is desirable that the submarine operator be able to predict from a plot of temperature-vs-depth, how his ship should be handled to make it dive and surface best. Failure to so predict the effects of varying temperatures may delay his maneuvers and require him to dive or ascend slowly while he experiments with various amounts of flooding, bow plane and speed.

It is an object of the present invention to provide means for automatically modifying the responses of a diving-trainer to simulate the effects that variations of water temperature with depth have on a diving submarine.

It is a further object to provide a curve-following device for controlling such effects so that the pattern of performance of the simulated submarine can be quickly changed by substitution of one temperature-vs-depth curve for another.

It is a further object to provide an improved photoelectric curve follower for such purpose so that new control curves can be constructed readily from paper curve sheets or the like.

These and other objects and advantages will be apparent from the following description of one specific embodiment of the invention. In the drawings.

A Navy submarine diving trainer in operational use comprises a mock-up of a control room of a submarine, by means of which submarine personnel are trained in the techniques of diving procedure. It includes a bridge control station for the student trainee and has manual controls and indicators for his use. There is also an umpire control station and problem computer where the instructor sets controls to introduce factors such as submarine speed, plane positions, quantity and disposition of ballast, water density effects and other information from which the trainer can automatically simulate sea conditions. This trainer is of the type shown in blueprint ZS 68 Bl. 3, Roeder-T-Gerat II of 10–1–35 by Askania-Werke, Bambergwerk, Berlin Friedenan and described in Roeder-T Apparatus manual revised August 21, 1936, by American Askania Corp., 1603 S. Michigan Avenue, Chicago, Illinois. The transmitting motor 76 therein is the same as applicants' synchro generator 28 and applicants' shaft 14 is connected to the depth rate pulley 71 in the trainer.

An important factor of change in water density due to changes in water temperature with change in depth requires the close attention of the instructor since it has to be continually varied. This is done by rotating a density control shaft input to the computer. The computer output consists of a shaft which rotates in accordance with the depth of the simulated dive.

Figure 1:
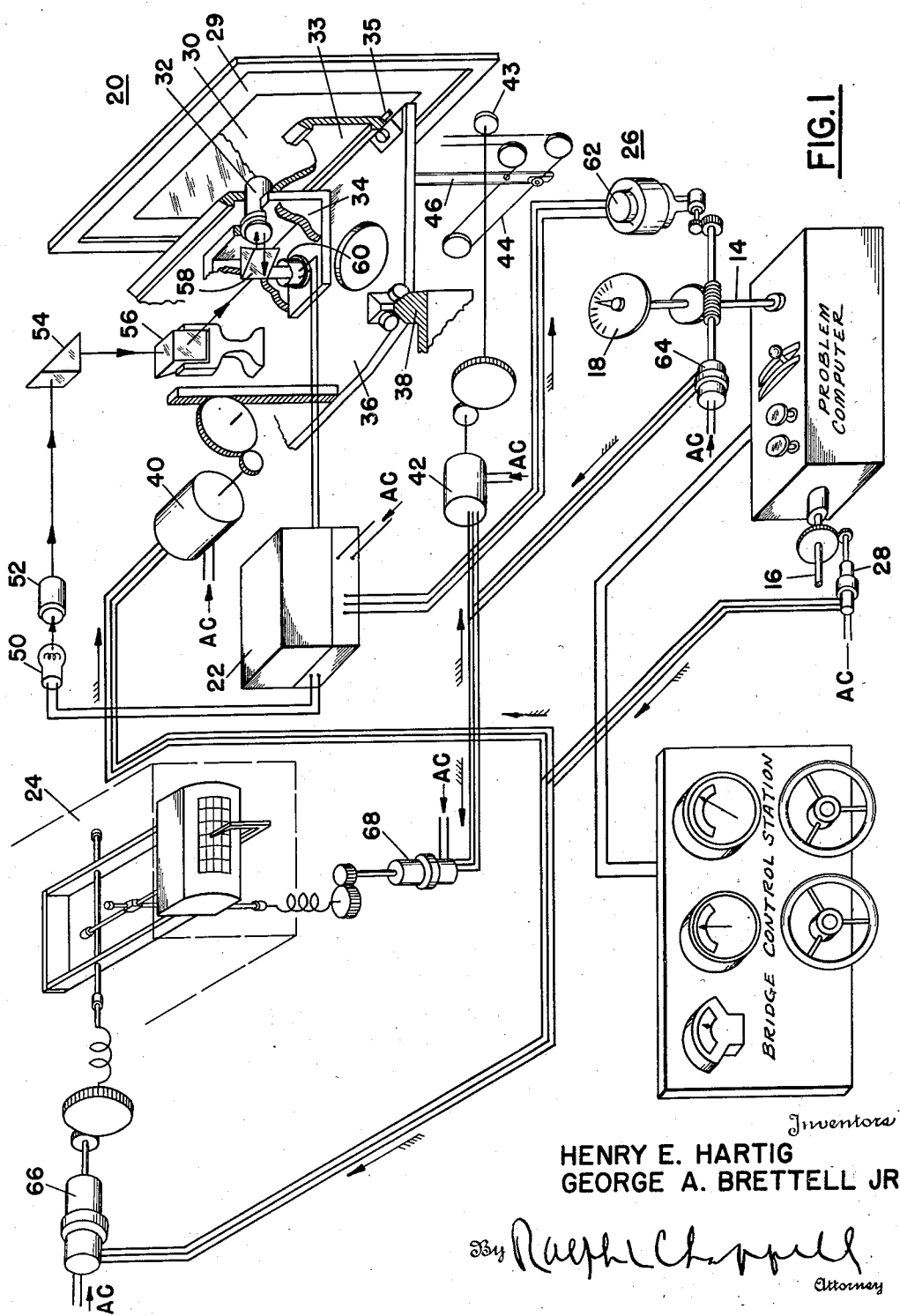
Fig. 1 is a pictorial diagram of the bathythermograph simultator comprising the present invention.

The bathythermograph simulator comprising the present invention, when attached to the diving trainer, controls the apparent water density automatically as a function of depth and in accordance with patterns recorded on master cards. The depth function is received by the simulator from the computer output shaft and the water density function is fed from the simulator into the computer via its density control shaft. The internal mechanism of the problem computer for coupling the input and output shafts thereof constitutes no part of this invention. In Fig. 1, there is shown a density control shaft 14 and a computer output shaft 16 having connections to the bathythermograph simulator of the present invention which includes scanning unit 20, amplifier 22, simulated recorder 24, a drive unit 26 and a depth synchro 28.

Figure 2:
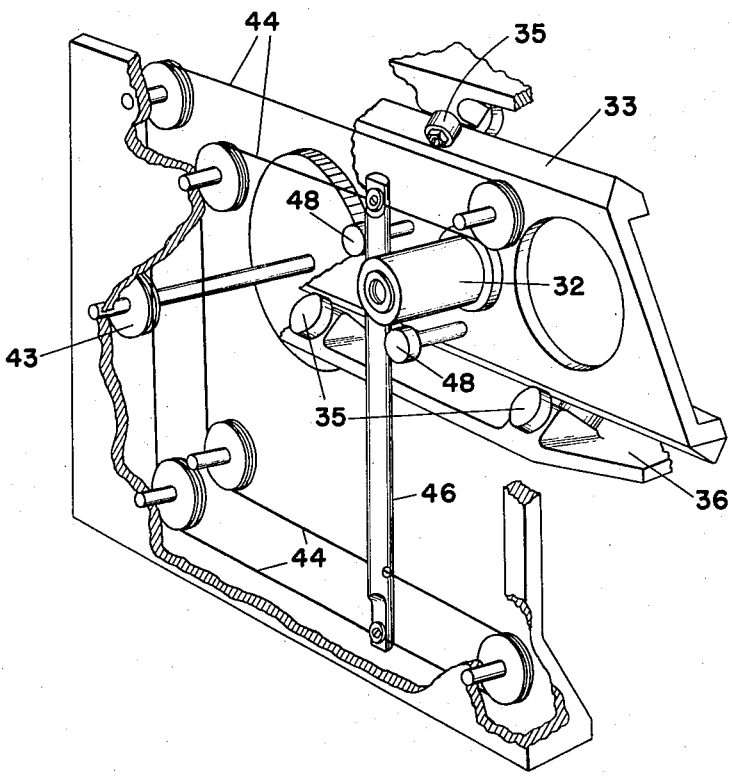
Fig. 2 is a detail view of the scanning unit of the system of Fig. 1.

The scanning unit includes a frame 29 for holding a pattern plate or curve sheet 30, and a lens 32 adapted to scan the plate. This lens is carried on a car 34 which is mounted on a track 33 which in turn travels horizontally in rollers 35 on an elevator 36. The elevator 36 moves up and down on stationary ways 38, and is driven by a synchro motor 40 which in turn is driven electrically from the depth synchro generator 28. The horizontal motion of the car 34 is controlled by synchro motor 42 through a drum 43 and a looped wire 44 which latter carries a vertical rod 46. As is shown in Fig. 2, the ends of the vertical rod 46 are fastened to two spans of the wire 44 which move in the same direction. Rollers 48 on the track 33 engage the rod 46 to transmit the horizontal motion to the lens.

Light from a lamp 50 is focused by lens 52 into a substantially parallel beam and directed onto a stationary prism 54 which reflects the beam of light downward onto a second prism 56 which is carried by the elevator 36, and which in turn directs the beam of light horizontally onto a third prism 58 mounted on the car 34. This arrangement of the prisms keeps the light beam directed onto the prism 58 regardless of the motions of the elevator and car. The prism 58 covers approximately half of the opening of lens 32. It directs a beam of light into the lens 32 which focuses it into a small sharp spot on the pattern plate 30. A part of the light reflected from the surface of the pattern plate 30 is focused by the lens 32 onto a photoelectric tube 60 which is mounted on the car 32 next to the prism 58.

The objective lens, or scanning lens 32 consists of a microscope objective, the lens elements of which are coated to reduce surface reflections. This coating is desirable because it reduces the amount of light that reaches the photoelectric tube 60 without going first to the plate 30, and so increases the sensitivity of the photoelectric system.

The pattern plate 30 carries a curve of temperature-vs-depth, the depth coordinate being vertical with the zero value at the top and the temperature coordinate being horizontal with temperatures increasing toward the left as seen in Fig. 1. The plate 30 consists of a sheet of white paper pasted onto a glass plate with the portion of the sheet on the high temperature side of the curve (to the left as seen in Fig. 1) painted black with a dead or matte finish so as to reflect light poorly. Conveniently, the sheet of paper contains a printed grid on the front surface with the temperature curve drawn on it. Then when the plate is prepared it can be held up to the light so that the curve can be seen through the paper for guiding the application of the black paint.

The output of photoelectric tube 60 is transmitted to amplifier 22 which in turn drives motor 62 in one direction when the spot of light is projected by lens 32 on the white portion of the pattern plate 30 and in the opposite direction when the spot is directed onto the dark portion of the plate. Motor 62 drives density control shaft 14 and also a synchro generator 64 which in turn drives synchro motor 42 which controls the horizontal motion of the scanning lens 32. The direction of the drive is such that darkening of the phototube 60 causes the lens 32 to be moved to the right (as seen in Fig. 1) to bring the lens toward the white area and conversely a brightening of the photo tube causes the lens to be carried toward the black area. Preferably the amplifier is so adjusted that it drives the motor in neither direction for some median value of light on the photoelectric cell 60 which corresponds to the spot of light lying partly on the white portion and partly on the black portion of the plate 30. The photoelectric tube 60, amplifier 22, motor 62, synchro generator 64, synchro motor 42, constitute elements of a servo system for making the lens 32 seek the boundary between the light and dark areas of the plate 30.

In operation, as the synchro generator 28 is driven according to the depth of the simulated submarine dive, synchro motor 40 moves the elevator 36 so that the lens 32 moves down across the pattern plate 30 to scan it. Obviously the driving ratios must be such that the depth scale on the pattern plate 30 corresponds to the distance that the elevator 36 carries the lens 32 down for a given depth of the simulated dive. The amplifier 22 continually drives the motor 62 in such a direction as to bring the lens 32 to the margin between the black and white areas on the pattern plate 30 so that the lens 32 in effect follows the temperature curve as it scans the plate in the direction of depth. Consequently at each depth of the simulated dive, the shaft 14 is automatically set to the water temperature (and therefore water density) assigned to that depth by the curve on the pattern plate 30.

Conveniently, the scanning unit 20 is located near the umpire's control station. Since the lens 32, in following the curve, always keeps the spot of light partly on the white (not-blackened) portion of the plate 30, the spot of light will shown through the translucent paper and indicate to the umpire the depth of the dive.

The simulated recorder 24 is constructed to look like an actual temperature recorder such as is used aboard submarines, and it is used to draw a temperature-vs.-depth graph as the simulated dive is made, just as such a graph would be drawn in an actual submarine during a dive. The depth coordinate from shaft 16 is fed into the recorder by synchro motor 66 driven from the depth synchro generator 28 to move the card up and down, and the temperature data which controls the pen is fed in by synchro motor 68 driven from the synchro generator 64.

I will be apparent that the invention is not limited to the specific embodiment described herein, but that it is capable of numerous variations, within the scope of the claims.

We claim:

1. A bathythermograph simulator for use with a submarine diving trainer having an output representative of simulated depth of a submarine and an input representing water temperature information, said simulator comprising the combination of a graph having temperature indications extending in one direction thereon related to depth indications extending in another direction perpendicular to said one direction, depth selecting means operatively connected to said output for selecting depth indication on said graph corresponding to the simulated depth of said submarine, and temperature indication responsive means for sensing the graph temperature indication corresponding to said selected depth, said sensing means being operatively connected to said input.

2. In a submarine trainer having an output shaft selectively rotatable to positions indicative of simulated submarine depths and an input shaft rotatable to positions indicative of water density information, the combination of a position sensing element movable orthogonally to different positions corresponding to related values of depth and water density, means operatively connecting said output shaft and said element for moving said element in one orthogonal direction to a position indicative of a new depth value corresponding to a change in position of the output shaft, and means operatively connected to said element and responsive to the change in position sensed thereby for moving said element in the other orthogonal direction to a position indicative of the water density value related to said new depth value, said last named means being operatively connected to said input shaft to rotate it in accordance with movement of said element in said other orthogonal direction.

3. A bathythermograph simulator for use with a submarine diving trainer having an output representative of simulated depth of a submarine and an input representing water temperature information, said simulator comprising the combination of a graph representative of the relation between water temperature and depth, said graphical representation having thereon temperature indications and depth indications extending in mutually perpedicular directions, depth selecting means operatively connected to said output for selecting a depth indication on said graph corresponding to the simulated depth of said submarine, said depth selecting means comprising a vertically movable platform vertically movable by said connecting means to a position directly related to said selected depth indication on said graph, light directing means on said platform for projecting a beam of light to said graph, temperature indication responsive means for sensing a deviation of said light beam from a point on said graph corresponding to said selected depth, said temperature indication responsive means comprising photoelectric means mounted for horizontal movement on said platform for receiving light information reflected from said graph, positioning means responsive to said photoelectric means for moving said photo-electric means to the temperature indication corresponding to said point on said graph at said selected depth, and means for operatively connecting said positioning means to said input.

4. In a device of the class described, the combination of a pattern plate having adjoining light and dark areas separated by a line representing water temperature as a function of depth as respectively indicated along mutually perpendicular dimensions of said plate, prismatic means for projecting a light beam to impinge upon said plate, said projecting means comprising fixed means for projecting a light beam parallel to one of said dimensions, a platform mounted for movement in a direction parallel to said one dimension, first prism means on said platform for bending said beam to a direction parallel to the other of said dimensions, a carriage mounted on said platform for movement in a direction parallel to said other dimension, second prism means on said carriage for bending said beam to said plate in a direction perpendicular thereto, photo-electric means mounted on said carriage for receiving at least a portion of the light of said beam which is reflected from said plate and for converting said received light to an electric signal indicative of the intensity of received light, means for moving said platform parallel to said one dimension, means responsive to said signal for shifting said carriage parallel to said other dimension in a direction to move said beam to said line, and output means coupled with said shifting means for representing the position of said projected beam along said other dimension.

5. A bathythermograph simulator for use with a submarine trainer having an output shaft rotatable in accordance with simulated changes in depth and an input shaft rotatable in accordance with changes in water temperature, in combination, a chart having contiguous dark and light areas defining therebetween a demarcation line indicative of temperature values measurable along one orthogonal coordinate of the chart and corresponding depth values measurable along the other orthogonal coordinate of the chart, prismatic means for projecting a light beam to impinge upon said chart, said projecting means comprising fixed means for projecting a light beam parallel to said other coordinate, a platform mounted for movement in a direction parallel to said other coordinate, first prism means on said platform for bending said beam to a direction parallel to said one coordinate, a carriage mounted on said platform for movement in a direction parallel to said one coordinate, second prism means on said carriage for bending said beam to said chart in a direction perpendicular thereto, photo-electric means mounted on said carriage for receiving at least a portion of the light of said beam which is reflected from said plate and for converting said received light to an electric signal indicative of the intensity of received light, means for moving said platform parallel to said other coordinate, means responsive to said signal for shifting said carriage means parallel to said one coordinate in a direction to move said beam to said line, and output means coupled with said shifting means for representing the position of said projected beam along said one coordinate.

References Cited in the file of this patent

UNITED STATES PATENTS

| | | |
|---|---|---|
| 1,959,654 | Berg | May 22, 1934 |
| 2,225,821 | Cook | Dec. 24, 1940 |
| 2,261,644 | Cockrell | Nov. 4, 1941 |
| 2,445,041 | Scholz | July 13, 1948 |

FOREIGN PATENTS

| | | |
|---|---|---|
| 374,171 | Italy | Aug. 17, 1939 |